United States Patent
Lee

(10) Patent No.: US 9,057,818 B2
(45) Date of Patent: Jun. 16, 2015

(54) ADJUSTING ASSEMBLY FOR A LENS OF A CAMERA

(71) Applicant: Hunt Electronic Co., Ltd., Keelung (TW)

(72) Inventor: Shin-Rong Lee, Keelung (TW)

(73) Assignee: Hunt Electronics Co., Ltd., Keelung (TW)

( * ) Notice: Subject to any disclaimer, the term of this patent is extended or adjusted under 35 U.S.C. 154(b) by 0 days.

(21) Appl. No.: 14/179,851

(22) Filed: Feb. 13, 2014

(65) Prior Publication Data

US 2014/0347754 A1 Nov. 27, 2014

(30) Foreign Application Priority Data

May 22, 2013 (TW) .............................. 102209467 U

(51) Int. Cl.
  G02B 7/02 (2006.01)
  G02B 15/14 (2006.01)
  G02B 7/04 (2006.01)
  G03B 3/00 (2006.01)
  G03B 17/00 (2006.01)
  G03B 13/18 (2006.01)
  G03B 13/32 (2006.01)
  F16B 41/00 (2006.01)
  G03B 17/02 (2006.01)
  G08B 13/196 (2006.01)
  H04N 5/225 (2006.01)

(52) U.S. Cl.
  CPC .. *G02B 7/04* (2013.01); *G02B 7/02* (2013.01); *G03B 3/00* (2013.01); *G02B 15/14* (2013.01); *G03B 13/18* (2013.01); *G03B 13/32* (2013.01); *G03B 17/00* (2013.01); *F16B 41/002* (2013.01); *G03B 17/02* (2013.01); *G08B 13/19619* (2013.01); *G08B 13/19626* (2013.01); *H04N 5/2254* (2013.01)

(58) Field of Classification Search
  CPC .............. G02B 7/00; G02B 7/02; G02B 7/04; G02B 7/102; G03B 3/00; G03B 3/10; G03B 5/00; G03B 13/18; G03B 13/32; G03B 17/00; G03B 17/02; G03B 27/34; G03B 27/36; G08B 13/19619; G08B 13/19626; H04N 5/2254; F16B 41/002
  USPC .............. 359/694–698, 823, 825; 396/65, 89, 396/155, 143, 427
  See application file for complete search history.

(56) References Cited

U.S. PATENT DOCUMENTS

| | | | | | |
|---|---|---|---|---|---|
| 2,655,847 | A | * | 10/1953 | Harvey | 396/389 |
| 2,994,258 | A | * | 8/1961 | Schafer et al. | 396/65 |
| 3,566,765 | A | * | 3/1971 | Nagashima | 359/740 |
| 3,988,749 | A | * | 10/1976 | Frode et al. | 396/231 |
| 4,087,327 | A | * | 5/1978 | Feder et al. | 435/399 |

* cited by examiner

*Primary Examiner* — Loha Ben
(74) *Attorney, Agent, or Firm* — C. G. Mersereau; Nikolai & Mersereau, P.A.

(57) ABSTRACT

An adjusting assembly for a lens of a camera has a hollow housing with a mounting portion, at least one driving ring mounted around the lens, at least one turning rod mounted through the mounting portion and engaging with the at least one driving ring, and at least one limiting ring. The at least one limiting ring is embedded in the mounting portion of the housing and prevents the at least one turning rod from dropping out of the housing. The mounting portion is integrally formed on the housing and has an enlarged thickness that allows the at least one turning rod to be stably mounted on the housing. The at least one turning rod is embedded in the housing, such that appearance of the housing is smooth and pleasing.

13 Claims, 6 Drawing Sheets

ADJUSTING ASSEMBLY FOR A LENS OF A CAMERA

BACKGROUND OF THE INVENTION

1. Field of the Invention

The present invention relates to an adjusting assembly for a lens of a camera, especially to an adjusting assembly that is used to adjust a lens of a surveillance camera.

2. Description of the Prior Art(s)

A surveillance camera is mounted at an intersection outdoors or an important location indoors to record or monitor events happening around and to provide recorded images when needed. To prevent a camera module of the surveillance camera from being damaged, the camera module is stored in a housing. The camera module includes a lens, a circuit board, an illumination device, a data storage system, and so on. Focus and diaphragm of the lens of the camera module have to be capable of being adjusted so as to capture clear images.

With reference to FIGS. 5 and 6, a conventional adjusting assembly for a lens of a camera comprises a housing 50, a base 60, a driving ring 80, an adjusting rod 70, a retaining ring 90, and an O ring 91. The housing 50 is used for storing a camera module of the camera. The base 60 is fastened to a bottom of the housing 50. The driving ring 80 is securely mounted around the lens and has a toothed portion. The adjusting rod 70 is rotatably mounted through the base 60 and has an operating end 71 and a toothed end 72. The operating end 71 protrudes out of the housing 50. The toothed end 72 protrudes inside the housing 50 and engages with the toothed portion of the driving ring 80. The retaining ring 90 is securely mounted around the adjusting rod 70 and is held between the housing 50 and the base 60. The O ring 91 is mounted around the operating end 71 of the adjusting rod 70 and is held between the operating end 71 and the base 60.

A user can hold the operating end 71 of the adjusting rod 70 to turn the adjusting rod 70. Thus, the driving ring 80 and the lens are turned as well, and the lens can be adjusted without disassembling the housing 50 apart. Furthermore, the base 60 is helpful in stabilizing the adjusting rod 70, such that the adjusting rod 70 can rotate relative to the housing 50 without displacement or tilt. The retaining ring 90 prevents the adjusting rod 70 from dropping out of the housing 50.

However, fastening the base 60 to the housing 50 takes time and increases manufacturing cost of the camera. Moreover, since the operating end 71 of the adjusting rod 70 protrudes out from the housing 50, appearance of the housing 50 is not smooth and is unpleasing.

To overcome the shortcomings, the present invention provides an adjusting assembly for a lens of a camera to mitigate or obviate the aforementioned problems.

SUMMARY OF THE INVENTION

The main objective of the present invention is to provide an adjusting assembly for a lens of a camera. The adjusting assembly has a hollow housing with a mounting portion, at least one driving ring mounted around the lens, at least one turning rod mounted through the mounting portion and engaging with the at least one driving ring, and at least one limiting ring. The at least one limiting ring is embedded in the mounting portions of the housing and prevents the at least one turning rod from dropping out of the housing.

The mounting portion is integrally formed on the housing and has an enlarged thickness that allows the at least one turning rod to be stably mounted on the housing. The at least one turning rod is embedded in the housing, such that appearance of the housing is smooth and pleasing.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
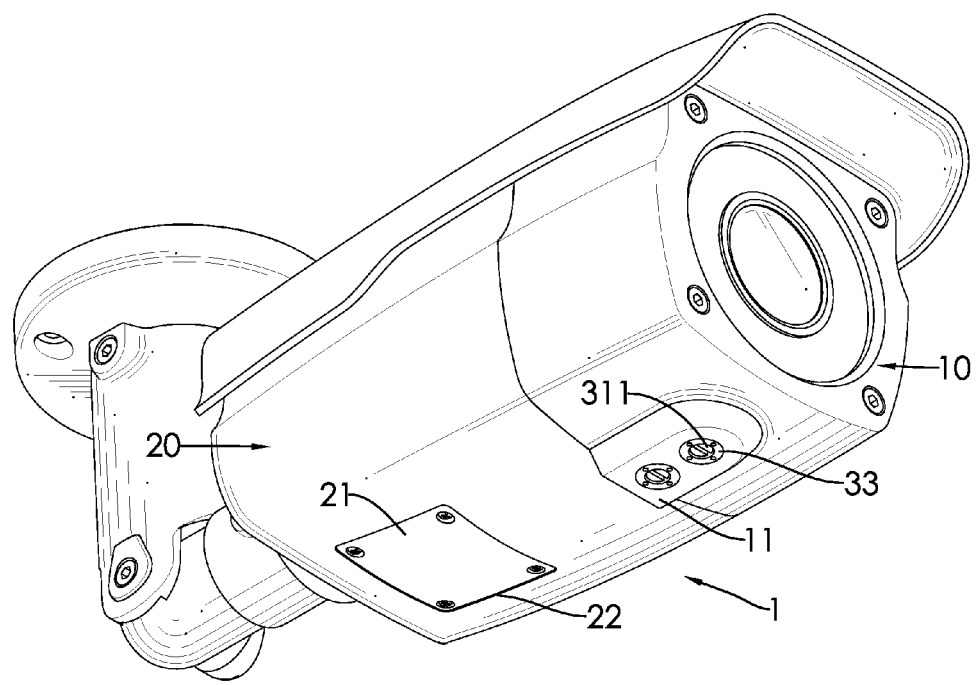
FIG. 1 is an operational perspective view of an adjusting assembly for a lens of a camera in accordance with the present invention.
Figure 2:
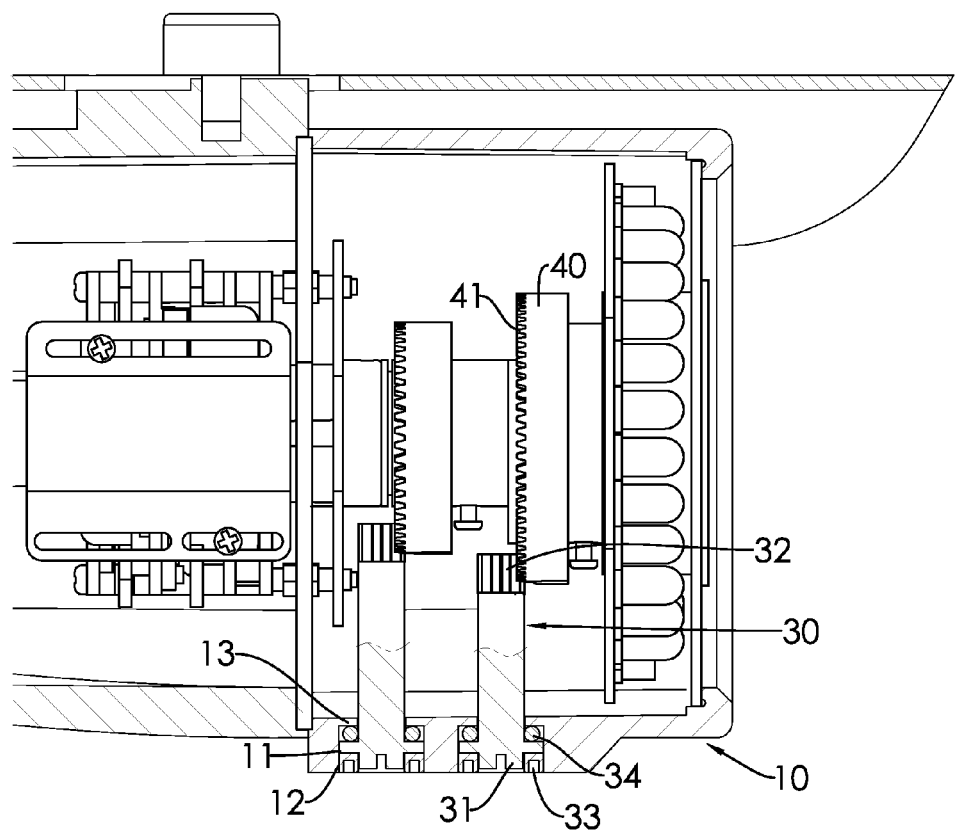
FIG. 2 is an enlarged operational side view in partial section of the adjusting assembly in FIG. 1.

With reference to FIGS. 1 and 2, an adjusting assembly for a lens of a camera comprises a housing 1, a cover 21, at least one driving ring 40, at least one turning rod 30, at least one limiting ring 33, and at least one O ring 34.

Figure 3:
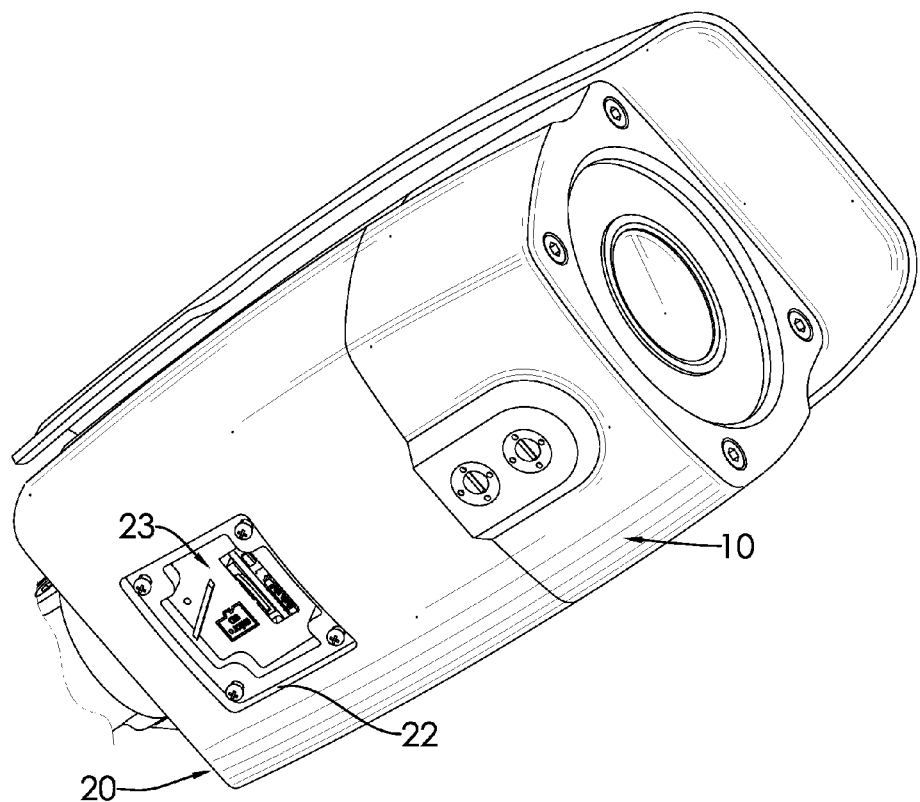
FIG. 3 is another enlarged perspective view of the adjusting assembly in FIG. 1.

With further reference to FIG. 3, the housing 1 is hollow and has a mounting portion 11, at least one through hole 12, at least one internal wall, at least one flange 13, and an opening 22. The mounting portion 11 is integrally formed on the housing 1. A thickness of the housing 1 is enlarged at the mounting portion 11. The at least one through hole 12 is formed through the mounting portion 11. Each of the at least one internal wall of the housing 1 is defined around a corresponding one of the at least one through hole 12 of the housing 1. Each of the at least one flange 13 of the housing 1 is formed on and around a corresponding one of the at least one internal wall of the housing 1. The opening 22 is formed through the housing 1 and corresponds in position to a memory card module 23 of the camera.

The cover 21 is detachably mounted on the housing 1 and selectively covers the opening 22 of the housing 1. By detaching the cover 21 from the housing 1, a memory card can be inserted into or drawn out of the memory card module 23 without disassembling the housing 1 apart.

In the preferred embodiment, the housing 1 is formed by attaching a front housing 10 and a rear housing 20. The mounting portion 11 and the at least one through hole 12 are formed on the front housing 10. The opening 22 is formed through the rear housing 20. The cover 21 is detachably mounted on the rear housing 20.

The at least one driving ring 40 is securely mounted around the lens of the camera and has a toothed portion 41.

Figure 4:
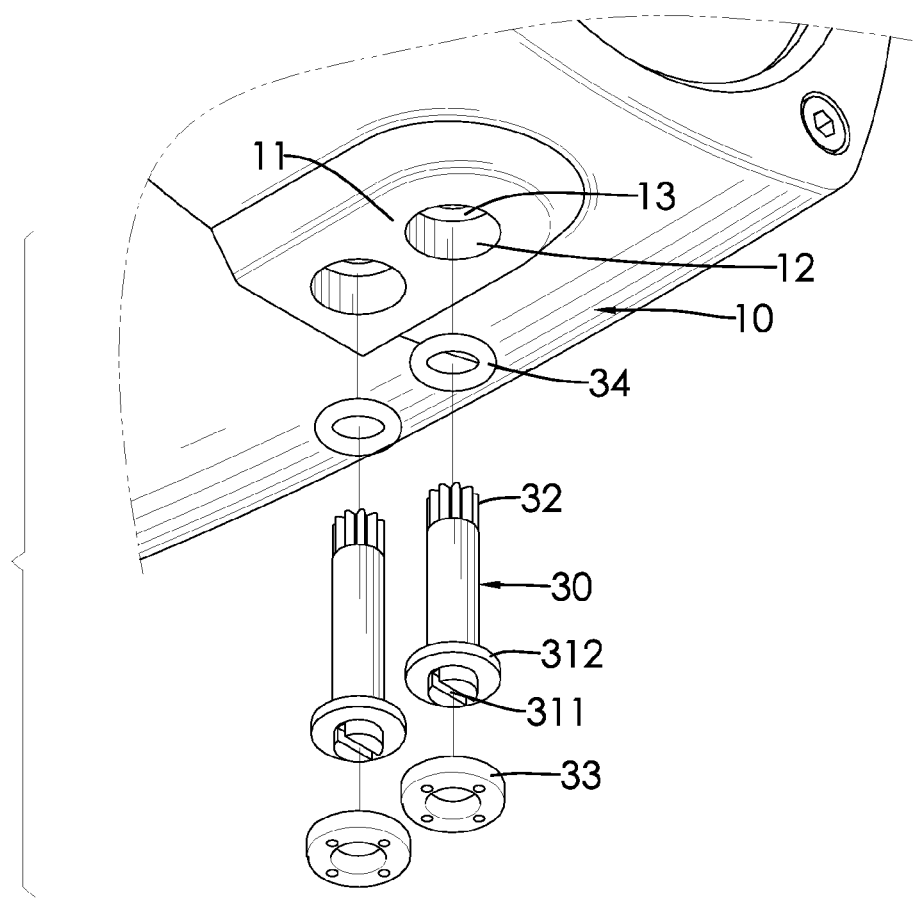
FIG. 4 is an enlarged exploded perspective view of the adjusting assembly in FIG. 1.
Figure 5:
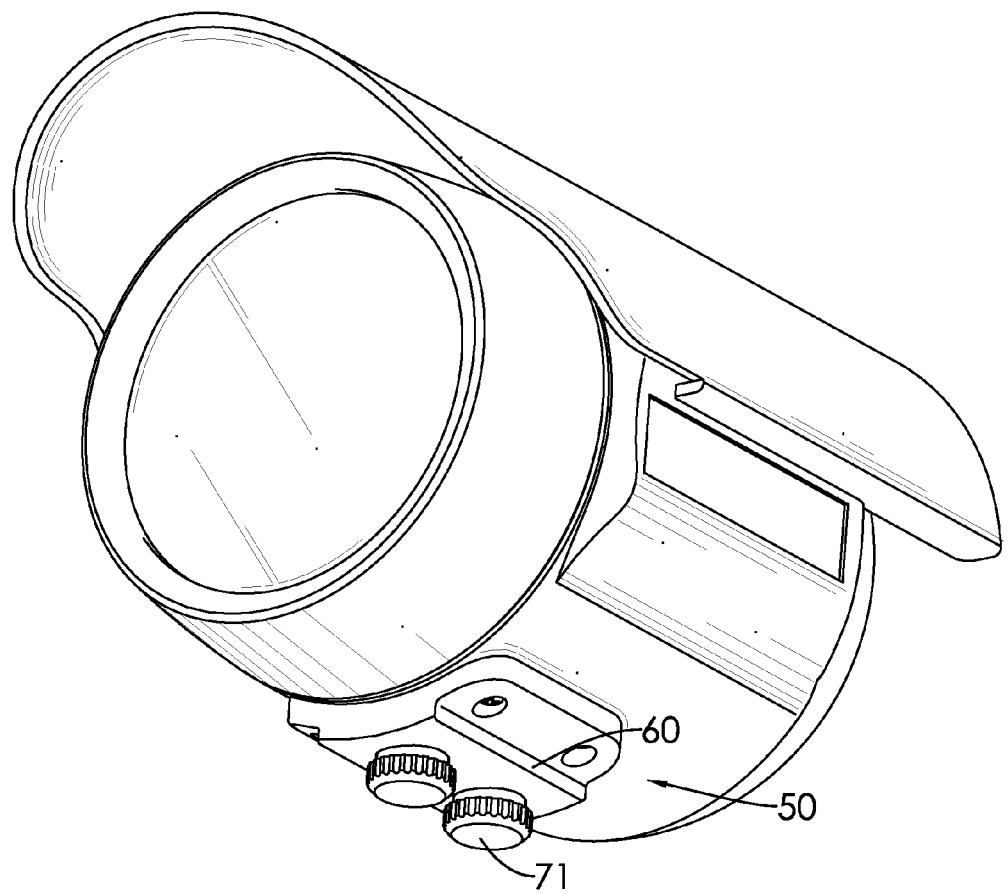
FIG. 5 is a perspective view of a conventional adjusting assembly for lens of a camera in accordance with the prior art.
Figure 6:
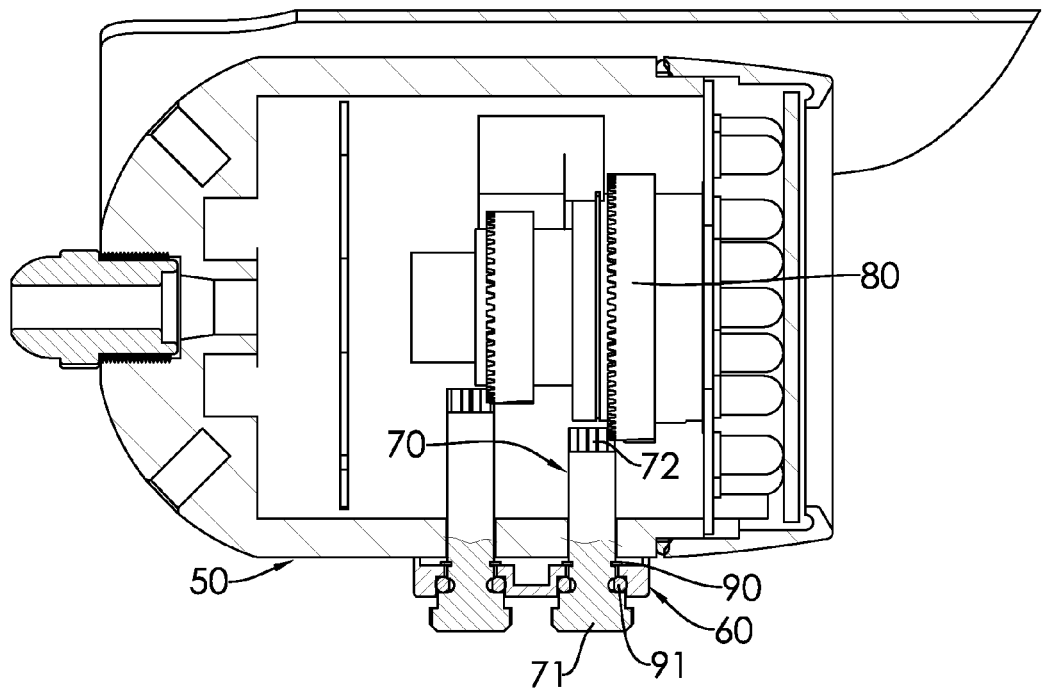
FIG. 6 is a side view in partial section of the conventional adjusting assembly in FIG. 5.

With further reference to FIG. 4, the at least one turning rod 30 is rotatably mounted through the at least one through hole 12 of the housing 1. Each of the at least one turning rod 30 has an operating end 31, a slot 311, a flange 312, and a toothed end 32. The operating end 31 protrudes in a corresponding one of the at least one through hole 12 of the housing 1 and has an end surface. The slot 311 is formed in the end surface of the operating end 31. The flange 312 of the turning rod 30 is formed around the operating end 31 and is disposed in the corresponding through hole 12. The toothed end 32 protrudes inside the housing 1 and engages with the toothed portion 41 of a corresponding one of the at least one driving ring 40.

The at least one limiting ring 33 is embedded in the at least one through hole 12 of the housing 1, such that the flange 312 of each of the at least one turning rod 30 is disposed between a corresponding one of the at least one flange 13 of the housing 1 and a corresponding one of the at least one limiting ring 33. Each of the at least one limiting ring 33 has an inner end surface and an outer end surface. The inner end surface of the limiting ring 33 abuts the flange 312 of a corresponding one of the at least one turning rod 30. The outer end surface of the limiting ring 33 is flush with an outer surface of the mounting portion 11 of the housing 1.

Each of the at least one O ring 34 is mounted around the operating end 31 of a corresponding one of the at least one turning rod 30 and is held between the flange 312 of the corresponding turning rod 30 and a corresponding one of the at least one flange 13 of the housing 1. With the at least one O ring 34 mounted in the at least one through hole 12 of the housing 1, moisture does not permeate into the housing 1 through the at least one through hole 12.

The turning rod 30 can be turned by tools, such as a flat-blade screwdriver or the like. When the at least one turning rod 30 is turned, the at least one driving ring 40 and the lens are turned as well, such that focus and/or diaphragm of the lens can be adjusted without disassembling the housing 1 apart.

The adjusting assembly for the lens of the camera as described has the following advantages.

The mounting portion 11 that is integrally formed on the housing 1 and has the enlarged thickness allows the at least one turning rod 30 to be stably mounted on the housing 1. No base needs to be additionally mounted on the housing 1. Moreover, with the operating end 31 of the at least one turning rod 30 mounted in the at least one through hole 12 of the housing 1, appearance of the housing 1 is smooth and pleasing.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adjusting assembly for a lens of a camera comprising:
    a hollowed housing having
        a mounting portion integrally formed on the housing, and
        at least one through hole formed through the mounting portion;
    a thickness of the housing being enlarged at the mounting portion;
    at least one driving ring securely mounted around the lens of the camera and having a toothed portion;
    at least one turning rod rotatably mounted through the at least one through hole of the housing, and each of the at least one turning rod having
        an operating end protruding in a corresponding one of the at least one through hole of the housing,
        a flange formed around the operating end and disposed in the corresponding through hole, and
        a toothed end protruding inside the housing and engaging with the toothed portion of a corresponding one of the at least one driving ring; and
    at least one limiting ring embedded in the at least one through hole of the housing, and each of the at least one limiting ring having
        an inner end surface abutting the flange of a corresponding one of the at least one turning rod, and
        an outer end surface being flush with an outer surface of the mounting portion of the housing.

2. The adjusting assembly as claimed in claim 1, wherein:
the housing is formed by attaching a front housing and a rear housing, and
the mounting portion and the at least one through hole are formed on the front housing.

3. The adjusting assembly as claimed in claim 1, wherein:
the housing further has an opening formed through the housing, and
the adjusting assembly further has a cover detachably mounted on the housing and selectively covering the opening of the housing.

4. The adjusting assembly as claimed in claim 1, wherein:
the housing further has
    at least one internal wall, and each of the at least one internal wall being defined around a corresponding one of the at least one through hole of the housing; and
    at least one flange, and each of the at least one flange of the housing is formed on and around a corresponding one of the at least one internal wall of the housing; and
the flange of each of the at least one turning rod is disposed between a corresponding one of the at least one flange of the housing and a corresponding one of the at least one limiting ring.

5. The adjusting assembly as claimed in claim 3, wherein:
the housing further has
    at least one internal wall, and each of the at least one internal wall being defined around a corresponding one of the at least one through hole of the housing, and
    at least one flange, and each of the at least one flange of the housing being formed on and around a corresponding one of the at least one internal wall of the housing; and
the flange of each of the at least one turning rod is disposed between a corresponding one of the at least one flange of the housing and a corresponding one of the at least one limiting ring.

6. The adjusting assembly as claimed in claim 1, wherein:
the operating end of each of the at least one turning rod has an end surface; and
each of the at least one turning rod further has a slot formed in the end surface of the operating end.

7. The adjusting assembly as claimed in claim 3, wherein:
the operating end of each of the at least one turning rod has an end surface; and
each of the at least one turning rod further has a slot formed in the end surface of the operating end.

8. The adjusting assembly as claimed in claim 4, wherein:
the operating end of each of the at least one turning rod has an end surface; and
each of the at least one turning rod further has a slot formed in the end surface of the operating end.

9. The adjusting assembly as claimed in claim 5, wherein:
the operating end of each of the at least one turning rod has an end surface; and
each of the at least one turning rod further has a slot formed in the end surface of the operating end.

10. The adjusting assembly as claimed in claim 4 further comprising at least one O ring, and each of the at least one O ring mounted around the operating end of a corresponding one of the at least one turning rod and held between the flange of the corresponding turning rod and a corresponding one of the at least one flange of the housing.

11. The adjusting assembly as claimed in claim 5 further comprising at least one O ring, and each of the at least one O ring mounted around the operating end of a corresponding one of the at least one turning rod and held between the flange of the corresponding turning rod and a corresponding one of the at least one flange of the housing.

12. The adjusting assembly as claimed in claim 8 further comprising at least one O ring, and each of the at least one O ring mounted around the operating end of a corresponding one of the at least one turning rod and held between the flange of the corresponding turning rod and a corresponding one of the at least one flange of the housing.

13. The adjusting assembly as claimed in claim 9 further comprising at least one O ring, and each of the at least one O ring mounted around the operating end of a corresponding one of the at least one turning rod and held between the flange of the corresponding turning rod and a corresponding one of the at least one flange of the housing.

* * * * *